United States Patent Office 3,113,131
Patented Dec. 3, 1963

3,113,131
PHENTHIAZINE DERIVATIVES
Serge Tchelitcheff, Vitry-sur-Seine, Raymond Jacques Horclois, Malakoff, and Jacques Georges Robert, Gentilly, France, assignors to Société des Usines Chimiques Rhône-Poulenc, Paris, France, a French body corporate
No Drawing. Filed Dec. 13, 1960, Ser. No. 75,474
Claims priority, application Great Britain Dec. 18, 1959
2 Claims. (Cl. 260—243)

This invention relates to new phenthiazine derivatives, to processes for their preparation and pharmaceutical compositions containing them.

It is well known that various N-substituted phenthiazine derivatives possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has, nevertheless, been demonstrated that of the very large number of possible N-substituted phenthiazine compounds, which have heretofore been proposed or tested by various workers, only comparatively few types have been proved to have useful application in human or veterinary medicine and that both the nature and the degree of useful effect can radically alter even with apparently small changes in chemical structure.

According to the present invention, there are provided the hitherto unknown 10-dialkylaminoalkylphenthiazines of the general formula:

[Structure I: phenthiazine with numbered positions 1-9, CHO at position 3, and A—N(R)$_2$ at position 10]

A—N(R)$_2$         (I)

(wherein A represents a divalent, straight or branched saturated aliphatic hydrocarbon group containing 2 to 5 carbon atoms with at least two carbon atoms between the nitrogen atom of the phenthiazine nucleus and the group —N(R)$_2$, and R represents an alkyl group containing not more than four carbon atoms) and their acid addition and quaternary ammonium salts. The hydrocarbon group A may be, for example, any of the following groups: —(CH$_2$)$_2$—, —CH$_2$—CH—,   —(CH$_2$)$_3$—,   —CH—(CH$_2$)$_2$—,   —CH$_2$—CH—CH$_2$—
       |                              |                              |
      CH$_3$                        CH$_3$                        CH$_3$ and —(CH$_2$)$_4$—; preferably it is the group —CH$_2$—CH—   or   —CH$_2$—CH—CH$_2$—
       |                              |
      CH$_3$                        CH$_3$ The radical R may be, for example, methyl, ethyl or n-propyl, methyl at present being preferred.

These new 10-dialkylaminoalkylphenthiazines substituted in the 3-position by a formyl group have unexpectedly been found to possess a high degree of antihistaminic activity while being practically free from all undesirable secondary effects, in particular, sedative action, which other known 3-acyl substituted compounds give rise to. Compounds of outstanding importance are 3-formyl-10-(3-dimethylamino-2-methylpropyl)phenthiazine and 3-formyl-10-(2-dimethylaminopropyl)phenthiazine and their acid addition salts, the former compound and its salts being preferred.

According to a feature of the present invention, the 10-dialkylaminoalkylphenthiazines of general Formula I are prepared by the process which comprises reduction of the cyano group of a 3-cyanophenthiazine derivative of the general formula:

[Structure II: phenthiazine with CN at position 3 and A—N(R)$_2$ at position 10]

A—N(R)$_2$         (II)

(wherein A and R are as hereinbefore defined) into a formyl group by the application of known methods for effecting conversion of a cyano group into a formyl group. By the term "known methods" as used in this specification and accompanying claims is meant methods heretofore used or described in the chemical literature.

A specific process according to the invention comprises reaction of a 3-cyanophenthiazine derivative of Formula II with a solution of sodium triethoxyaluminium hydride in an inert organic solvent such as tetrahydrofuran and the dimethyl and diethyl ethers of diethylene glycol, preferably at room temperature (i.e. 15° to 20° C.), followed by hydrolysis of the resulting product with, for example, aqueous sulphuric acid.

Another specific process according to the invention comprises catalytic hydrogenation of a 3-cyanophenthiazine derivative of Formula II using, for example, Raney nickel as catalyst in the presence of an acid addition salt of semicarbazide (e.g. hydrochloride) and converting the resulting semicarbazone of the general formula:

[Structure III: phenthiazine with CH=N—NH—CONH$_2$ at position 3 and A—N(R)$_2$ at position 10]

A—N(R)$_2$         (III)

(wherein A and R are as hereinbefore defined) into the corresponding 3-formyl compound by heating at a temperature below 100° C. in the presence of a compound containing a carbonyl function. Pyruvic acid is preferably employed as the compound containing a carbonyl function and the semicarbazone and pyruvic acid are heated together at a temperature between 70 and 75° C.

According to a further feature of the invention, the 10-dialkylaminoalkylphenthiazines of general Formula I are prepared by the process which comprises the decarboxylation of a phenthiazine-10-carboxylate of the general formula:

[Structure IV: phenthiazine with CHO at position 3 and COO—A—N(R)$_2$ at position 10]

COO—A—N(R)$_2$         (IV)

(wherein A and R are as hereinbefore defined) by heating at a temperature above 100° C., preferably between 150° to 220° C., until evolution of carbon dioxide ceases.

The reaction can be effected with the phenthiazine-10-carboxylate alone, i.e. without a diluent or in an inert organic solvent of high boiling point such as diphenyl, diphenyl oxide, quinoline, weak bases or o-dichlorobenzene.

The new phenthiazine derivatives of Formula I obtained according to the foregoing processes may be purified by physical methods such as distillation, crystallisation or chromatography, or by chemical methods such as the formation of salts, crystallisation of the salts and decomposition of them in an alkaline medium. In the said chemical method, the nature of the anion of the salt is immaterial, the only requirement being that the salt must be well-defined and readily crystallisable.

The new 3-formyl-10-dialkylaminoalkylphenthiazines may be converted in manner known per se into acid addition salts and quaternary ammonium derivatives. The acid addition salts may be obtained by the action of acids on the new phenthiazine derivatives in appropriate solvents. As organic solvents there may be used, for example, alcohols, ethers, ketones or chlorinated hydrocarbons; water may advantageously be used as an inorganic solvent. The salt which is formed is precipitated, if necessary after concentration of its solution, and is separated by filtration or decantation. The quaternary ammonium derivatives may be obtained by the action of esters on the phenthiazine derivatives, optionally in an organic solvent, at room temperature or, more rapidly, with gentle heating.

For therapeutic purposes the bases of general Formula I are employed as such or, as is preferred, in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, succinates, benzoates, maleates, fumarates, theophyllinacetates, salicylates, phenolphthalinates, or methylene-bis-β-hydroxynaphthoates) so that the beneficial physiological properties inherent in the bases are not vitiated by side-effects ascribable to the anion. Similarly, they may also be employed in the form of non-toxic quaternary ammonium salts obtained by reaction with organic halides (e.g. methyl or ethyl iodide, chloride or bromide, or allyl or benzyl chloride or bromide) or other reactive esters, e.g. methyl or ethyl sulphate or toluene-p-sulphonate.

The following examples illustrate the invention.

*Example I*

To 3-cyano-10-(3 - dimethylamino - 2 - methylpropyl)-phenthiazine (15.7 g.) is added gradually at room temperature a solution (150 cc.) of triethoxyaluminium sodium hydride in tetrahydrofuran (107 g. per litre), prepared according to Hesse and Schrodel, Liebigs Ann. 607 (1957), 33. A small quantity of hydrogen is liberated and the reaction is accompanied by a substantial evolution of heat. When the reaction is complete, the reaction products are treated with a 5 N aqueous solution (200 cc.) of sulphuric acid and washed with benzene (100 cc.). The free base is obtained by the addition of potassium bicarbonate (100 g.), and is extracted with benzene (400 cc.). On filtering and removing the solvent in vacuo, a yellow solid residue (10.5 g.) is obtained.

This residue is dissolved in ether (200 cc.) and added gradually to a solution of maleic acid (3.51 g.) in ether (600 cc.). A yellow product precipitates which is filtered off, washed with ether (100 cc.) and dried in vacuo. There is thus obtained the acid maleate of 3-formyl-10-(3-dimethylamino-2-methylpropyl)phenthiazine (11 g.), M.P. 100–130° C. The melting point of the product is raised to 168–170° C. after recrystallisation from ethanol.

*Example II*

3-cyano-10-(3-dimethylamino - 2 - methylpropyl)phenthiazine (32.3 g.) in a mixture of methanol (100 cc.) and water (100 cc.) is hydrogenated under normal pressure at 20° C. for about 10 hours in the presence of semicarbazide hydrochloride (23.4 g.), crystalline sodium acetate (30 g.) and a suspension (24 cc.) consisting of Raney nickel mixed with about 50% of water. After the hydrogenation, the catalyst is filtered off and washed with hot methanol (250 cc., 100 cc. and then 50 cc.). The filtrates are combined and the solution thus obtained is evaporated in vacuo at water-bath temperature. The residue is taken up in water (150 cc.), chloroform (150 cc.) and potassium bicarbonate (20 g.). The organic layer is decanted and the aqueous portion is washed with chloroform (2×100 cc.). The chloroform solutions are dried over sodium sulphate and then evaporated on a water-bath. The residue is crushed in a mortar in the presence of benzene (150 cc.). After filtration, the residue is washed with benzene (50 cc.) and the product dried. Bright yellow crystals consisting of the semicarbazone of 3-formyl-10-(3-dimethylamino - 2 - methylpropyl)phenthiazine (27.2 g.), M.P. 199–200° C., are obtained.

The semicarbazone (27 g.) is dissolved in water (270 cc.) to which pyruvic acid (27 cc.) has been added. The solution is heated on the water bath at 75° C. for half an hour and allowed to cool. Ether is added and then gradually and with agitation potassium bicarbonate (162 g.). The ethereal solution is decanted and the aqueous portion extracted with ether (2×150 cc.). The ethereal solutions are combined and dried over sodium sulphate, and the ether is driven off in vacuo. There is thus obtained 3-formyl-10-(3-dimethylamino-2 - methylpropyl)-phenthiazine (31 g.). This compound is dissolved in ethanol (47 cc.) and a solution of maleic acid (9 g.) in ethanol (36 cc.) is added thereto. The solution obtained is cooled and maintained overnight in a refrigerator. After filtration, the solid fraction is washed with ethanol (30 cc.) and then with ether (15 cc.). After drying in vacuo at 20° C., there is obtained the acid maleate of 3-formyl-10-(3-dimethylamino-2 - methylpropyl)phenthiazine (26.9 g.), M.P. 168–170° C.

*Example III*

To a suspension of 3-cyano-10-(2-dimethylaminopropyl)phenthiazine (9.27 g.) in methanol (130 cc.) is added a solution of semicarbazide hydrochloride (6.69 g.) and sodium acetate (5.9 g.) in water (10 cc.), and then a suspension of Raney nickel (7 cc.) in water (20 cc.). The mixture is agitated at room temperature under a hydrogen pressure of about 5 cm. of water above atmospheric pressure. The hydrogenation is completed in the space of 50 minutes.

The catalyst is filtered off and washed with methanol (2×30 cc.). The filtrates are combined and concentrated to dryness under a pressure of about 25 mm. Hg. The residue is taken up in chloroform (100 cc.) and distilled water (50 cc.) and the mixture is made alkaline with potassium bicarbonate. The organic phase is separated and the aqueous phase is again extracted with chloroform (2×50 vv.). The chloroform solutions are combined, dried over anhydrous sodium sulphate and concentrated to dryness under a pressure of about 25 mm. Hg. After recrystallisation of the residue from benzene, there is obtained 3-formyl-10-(2-dimethylaminopropyl)-phenthiazine semicarbazone (5 g.), which is a yellow crystalline powder, M.P. 192–195° C.

A solution of the semicarbazone (5 g.) in a mixture of pyruvic acid (5 cc.) and water (50 cc.) is heated for 35 minutes between 70° and 75° C. After cooling to 15° C., the semicarbazone of pyruvic acid, which has crystallised, is filtered off and washed with water (2×10 cc.). The filtrate is made alkaline by the addition of potassium bicarbonate (30 g.) and ether (400 cc.). The organic phase is separated, and the aqueous phase is again extracted with ether (100 cc.). The ethereal solutions are combined and washed with water (2×100 cc.) and then dried over anhydrous sodium sulphate and concentrated to dryness under a pressure of 25 mm. Hg without exceeding 25° C. in the mass.

The orange-red oily base thus isolated is converted into its acid maleate by dissolving it in ethanol (40 cc.) and adding thereto a solution of maleic acid (1.6 g.) in ethanol (20 cc.). On crystallisation, there is obtained the acid maleate of 3-formyl-10-(2-dimethylaminopropyl)phenthiazine 3.3 g.), which is a yellow crystalline powder, M.P. 180–182° C.

The present invention further includes within its scope pharmaceutical compositions which comprise one or more compounds of general Formula I, or a non-toxic acid addition or quaternary ammonium salt thereof, and a significant amount of a pharmaceutical carrier. In clinical practice the compounds of the present invention will normally be administered orally, in consequence of which the preferred compositions are those of the kind suitable for oral administration.

Solid compositions for oral administration include compressed tablets, pills, dispersible powders and granules. In such solid compositions the active compound is admixed with at least one inert diluent such as calcium carbonate, potato starch, alginic acid or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents.

Compositions according to the invention for oral administration include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. The compositions may also take the form of sterile solids which may be dissolved in sterile water or some other sterile injectable medium immediately before use.

For rectal administration the active compound is incorporated in a suppository in known manner.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In human medicine, the compositions may be administered so as to give, in the case of oral administration, 20 to 600 mg. of active substance (calculated as a base) per day and, in the case of parenteral administration, 10 to 500 mg. of such substance (calculated as a base) per day, the quantity of active substance administered depending on the period of treatment and the age of the patient.

The following examples illustrate pharmaceutical compositions according to the invention.

*Example IV*

Tablets weighing 150 mg. are prepared having the following composition:

|  | Mg. |
|---|---|
| 3 - formyl - 10 - (3 - dimethylamino - 2 - methylpropyl)phenthiazine acid maleate | 13.6 |
| Starch | 103.4 |
| Hydrated silica | 30.0 |
| Magnesium stearate | 3.0 |

*Example V*

Tablets weighing 150 mg. are prepared containing:

|  | Mg. |
|---|---|
| 3 - formyl - 10 - (2 - dimethylaminopropyl)phenthiazine acid maleate | 27.5 |
| Starch | 89.5 |
| Hydrated silica | 30.0 |
| Magnesium stearate | 3.0 |

We claim:
1. Process for the preparation of 10-dialkylaminoalkylphenthiazines of the formula:

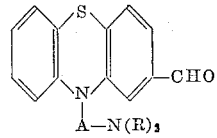

wherein A represents a divalent saturated aliphatic hydrocarbon group containing 2 to 5 carbon atoms with at least two carbon atoms between the nitrogen atom of the phenthiazine nucleus and the group —N(R)$_2$, and R represents an alkyl group containing not more than four carbon atoms, which comprises subjecting a 3-cyanophenthiazine derivative of the formula:

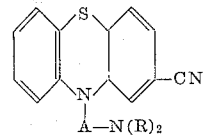

wherein A and R are as just defined, to catalytic hydrogenation in the presence of an acid addition salt of semicarbazide and heating the resulting semicarbazone of the formula:

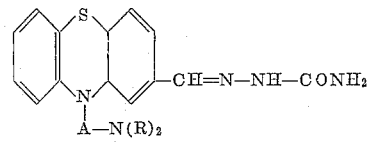

at a temperature below 100° C. in the presence of pyruvic acid.

2. Process according to claim 1 wherein the semicarbazone obtained is heated with pyruvic acid at a temperature between 70° and 75° C.

References Cited in the file of this patent

UNITED STATES PATENTS

| 2,877,224 | Jacob et al. | Mar. 10, 1959 |
| 2,985,654 | Sherlock et al. | May 23, 1961 |

FOREIGN PATENTS

| 217,778 | Australia | Sept. 22, 1958 |
| 199,189 | Austria | Aug. 25, 1958 |

OTHER REFERENCES

Cauquil et al.: Bull. Soc. Chim., France, 1955, page 774.

Cauquil et al.: Bull. Soc. Chim., France, 1955, pages 1063, 1066 and 1072.

Schmitt et al.: Bull. Soc. Chim., France, 1957, pages 1474–81.

Fieser et al.: "Organic Chemistry," third edition, page 215, D. C. Heath and Co., third printing (1958).